(12) United States Patent
Hung et al.

(10) Patent No.: US 9,459,885 B2
(45) Date of Patent: Oct. 4, 2016

(54) SMART CARD MODULE AND OPERATING METHOD THEREOF

(71) Applicant: UNIVERSAL SCIENTIFIC INDUSTRIAL (SHANGHAI) CO., LTD., Shanghai (CN)

(72) Inventors: Chin-Hsing Hung, Nantou County (TW); Chin-Yang Chang, Nantou County (TW); Chun-Hsuan Shih, Nantou County (TW)

(73) Assignee: UNIVERSAL SCIENTIFIC INDUSTRIAL (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 14/662,324

(22) Filed: Mar. 19, 2015

(65) Prior Publication Data
US 2016/0188348 A1 Jun. 30, 2016

(30) Foreign Application Priority Data

Dec. 31, 2014 (CN) .......................... 2014 1 0852184

(51) Int. Cl.
*G06K 19/06* (2006.01)
*G06F 9/44* (2006.01)
*G06F 3/06* (2006.01)
(Continued)

(52) U.S. Cl.
CPC ........... *G06F 9/4411* (2013.01); *G06F 3/0625* (2013.01); *G06F 3/0653* (2013.01); *G06F 3/0679* (2013.01); *G06F 9/4403* (2013.01); *G06F 13/385* (2013.01); *G06F 13/4081* (2013.01)

(58) Field of Classification Search
CPC ................. G06K 19/07749; G06K 19/07769; G06Q 20/346

USPC ........................................ 235/492, 486, 487
See application file for complete search history.

(56) References Cited

U.S. PATENT DOCUMENTS 6,567,866 B1    5/2003  Poisner
7,971,791 B2    7/2011  Nishizawa et al.
(Continued)

FOREIGN PATENT DOCUMENTS

CN          1773482 A       5/2006
CN        103777702 A       5/2014
(Continued)

OTHER PUBLICATIONS

Taiwan Patent Office, Office action issued on Nov. 16, 2015.

*Primary Examiner* — Daniel St Cyr
(74) *Attorney, Agent, or Firm* — Li & Cai Intellectual Property (USA) Office (57) ABSTRACT

A smart module card and using method thereof are provided. The smart module card can be implemented in a peripheral platform having a transmitting port. The smart module includes a connecting port and a processing unit electrically connected thereto. The connecting port corresponds to the transmitting port, and the processing unit includes a plurality of functional chips. When the connecting port is electrically connected to the transmitting port, the processing unit receives an identification data provided by the peripheral platform to determine a plurality of predetermined operating functions required by the peripheral platform to be enabled, and the processing unit executes some of the functional chips to correspondingly enable the predetermined operating functions.

14 Claims, 7 Drawing Sheets (51) Int. Cl.
*G06F 13/40* (2006.01)
*G06F 13/38* (2006.01)

(56) References Cited

U.S. PATENT DOCUMENTS

| | | | | |
|---|---|---|---|---|
| 2009/0247237 A1* | 10/2009 | Mittleman | ............ | H04M 1/026 455/567 |
| 2011/0202465 A1* | 8/2011 | Mashhour | .............. | G06Q 20/20 705/67 |
| 2012/0137038 A1 | 5/2012 | Huang et al. | | |
| 2012/0272231 A1* | 10/2012 | Kwon | ....................... | G06F 8/61 717/173 |
| 2013/0275641 A1* | 10/2013 | Tsai | .................... | G06F 13/4068 710/301 |

FOREIGN PATENT DOCUMENTS

| TW | 201223229 A1 | 6/2012 |
|---|---|---|
| TW | M457336 U1 | 7/2013 |

* cited by examiner

SMART CARD MODULE AND OPERATING METHOD THEREOF

BACKGROUND OF THE INVENTION

1. Field of the Invention

The instant disclosure relates to a smart card module and using method thereof, in particular, to a smart card module capable of executing the functions corresponding to the functions of a peripheral platform according to an application of the peripheral platform.

2. Description of Related Art

Recently, computers have become commonly used in daily life. No matter at home, the office, or outside, the user may use the computer to deal with daily work or search information.

The user may use different kinds of computers in different situations. For example, a desktop computer may be used at home or in the workplace, and a laptop or tablet may be used when the user goes on an official trip, or goes out into a public place. Accordingly, whenever the user moves to a different situation, the user has to change to another computer to meet the demands of use. Nowadays, even if some portable electronic devices can complement this disadvantage to some extent, most portable electronic devices have lower function expandability than that of the desktop computer.

For example, for portable convenience, portable electronic devices are usually equipped with a smaller screen. However, when the user performs some entertainment activities using the computer, such as playing a game or watching a movie, the desktop computer which can be equipped with a larger screen is a preferable choice.

Accordingly, one may have more than one kind of computer, and there may be more than one computer in a family for each of the members. However, following the advance of technology, the development rate of the computer has improved. New products having faster operating speed and cheaper price are introduced in market every few months, such that the user rapidly replaces the computer. According to statistics, about 99% of computer mainframes are upgraded every two or three years, and 80% peripheral equipment may be replaced due to upgrades. The replacement of equipment brings a cost burden to the user, and the replaced computer mainframes and peripheral equipment may negatively impact on the environment during the following recycling process.

SUMMARY OF THE INVENTION

The object of the instant disclosure is to provide a smart card module and a using method thereof. The smart card module can be implemented in different peripheral platforms and be used to execute different functional chips according to the predetermined operating functions of the peripheral platform.

In order to achieve the aforementioned objects, according to an embodiment of the instant disclosure, a smart card module is provided. The smart card module can be implemented in a first peripheral platform having a first transmitting port. The smart module includes a connecting port and a processing unit electrically connected thereto. The connecting port corresponds to the first transmitting port, and the processing unit includes a plurality of functional chips. When the connecting port is plugged into the first transmitting port, the processing unit receives a first identification data provided by the first peripheral platform to determine a plurality of first predetermined operating functions required by the first peripheral platform to be enabled, and the processing unit executes some of the functional chips respectively corresponding to the first predetermined operating functions.

A using method of a smart card module is provided by another embodiment of the instant disclosure, in which the smart card module is implemented in a peripheral platform and includes a connecting port and a processing unit electrically connected thereto. The processing unit includes a plurality of functional chips. The method includes the steps of electrically connecting the connecting port to a transmitting port of the peripheral platform; booting up the processing unit; receiving an identification data provided by the peripheral platform through the connecting port by the processing unit to obtain a plurality of predetermined operating functions required by the first peripheral platform to be enabled; and executing some of the functional chips respectively corresponding to the predetermined operating functions according to the predetermined operating functions required by the first peripheral platform to be enabled.

The advantages of the smart card module and the using method of the smart card module according to the embodiments of the instant disclosure are that the processing unit of the smart card module is capable of determining the predetermined operating functions required by the first peripheral platform to be enabled in advance by receiving the identification data provided by the peripheral platform. Subsequently, the processing unit executes some of the functional chips respectively corresponding to the predetermined operating functions required to be enabled. As such, the same smart card module can be in combination with different kinds of peripheral platforms to form different kinds of electronic devices for different purposes. That is to say, the smart card module provided in the embodiment of the instant disclosure can be adapted to different operating environments. Accordingly, the number of computers owned by one person may be reduced. In addition, when the system upgrade is required, only the smart card module needs to be replaced while the peripheral equipment can be held so that the negative impact on the environment can be attenuated.

In order to further the understanding regarding the instant disclosure, the following embodiments are provided along with illustrations to facilitate the disclosure of the instant disclosure.

DETAILED DESCRIPTION OF THE PREFERRED EMBODIMENTS

In the following description, numerous specific details of the smart card module and the using method thereof according to the embodiments of the instant disclosure are set forth in order to provide a thorough understanding of one or more aspects and/or features described herein. It will be apparent, to one skilled in the art, to readily understand the advantages and the effectiveness of the instant disclosure. Furthermore, the instant disclosure can also be implemented or applied by various other specific examples. The details in the following descriptions can also be modified or changed based on different perspectives and applications without departing from the spirit of the instant disclosure. In addition, the drawings as referred to throughout the description of the instant disclosure are for illustrative purpose only, but not drawn according to actual scale, i.e., the actual scale of the related structure is not illustrated. The relative techniques of the instant disclosure will be set forth through the following embodiments, but are not intended to limit the scope of the instant disclosure.

Figure 1:
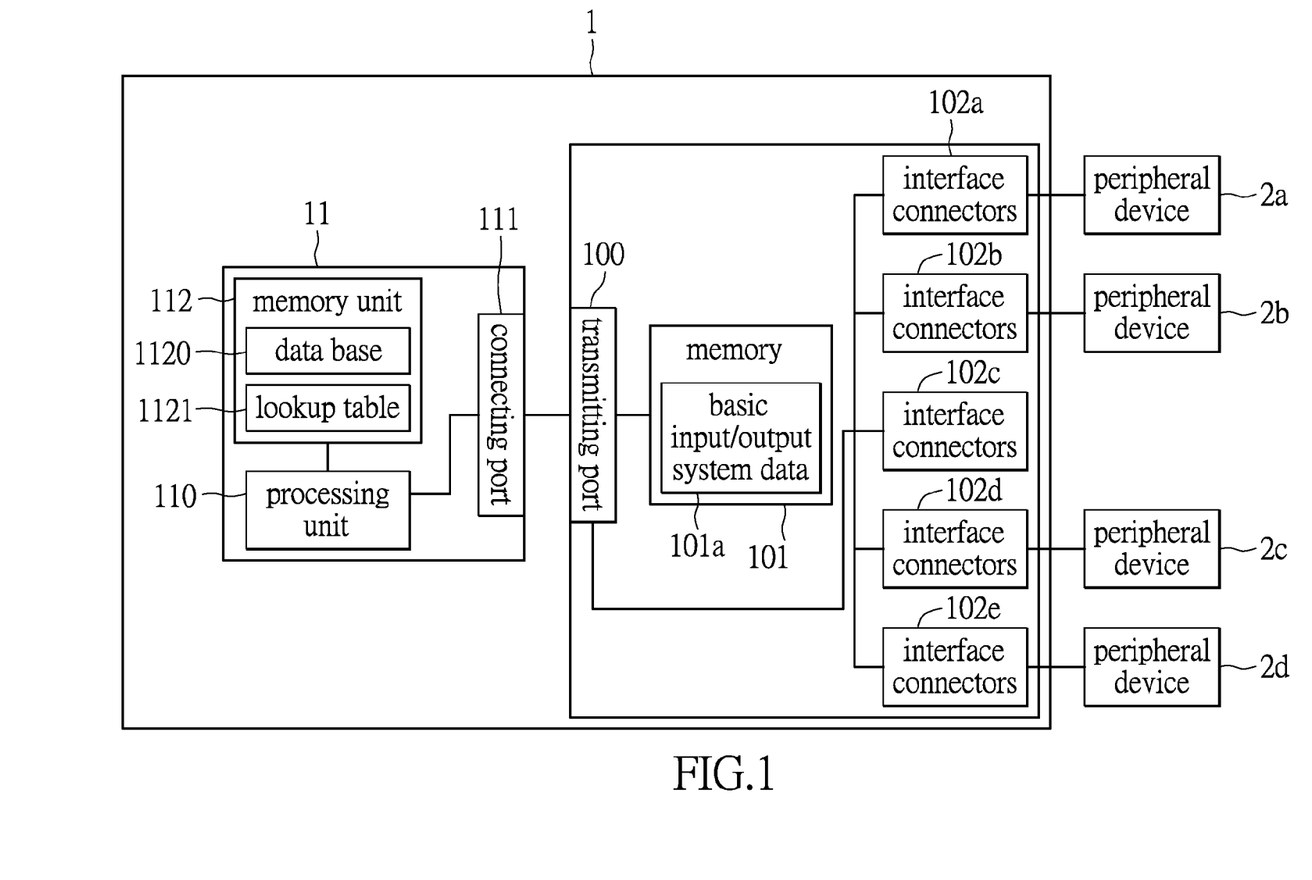
FIG. 1 shows a functional block diagram of a smart card module and a peripheral platform in accordance with an embodiment of the instant disclosure.
Figure 2:
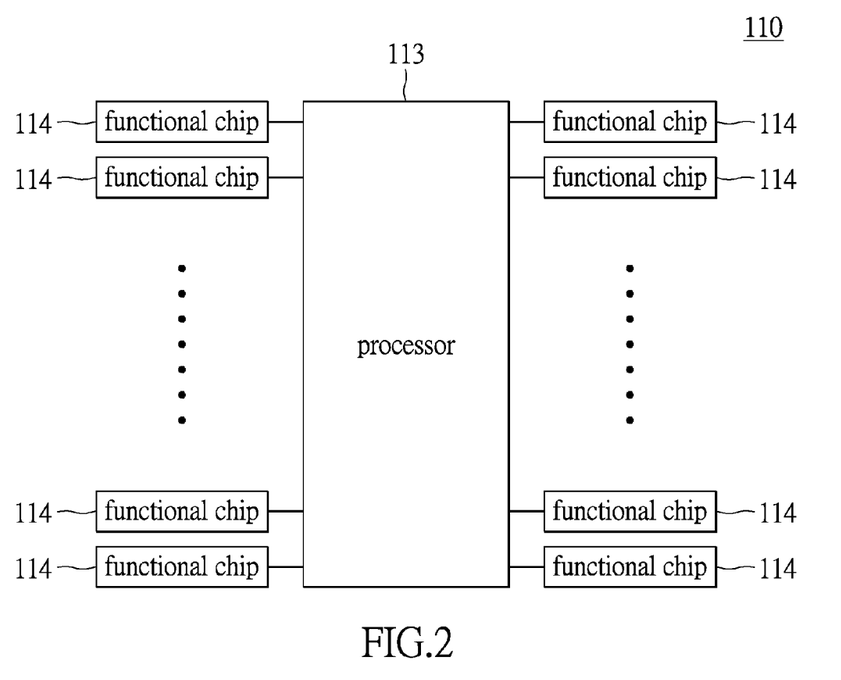
FIG. 2 shows a functional block diagram of the processing unit shown in FIG. 1.
Figure 3:
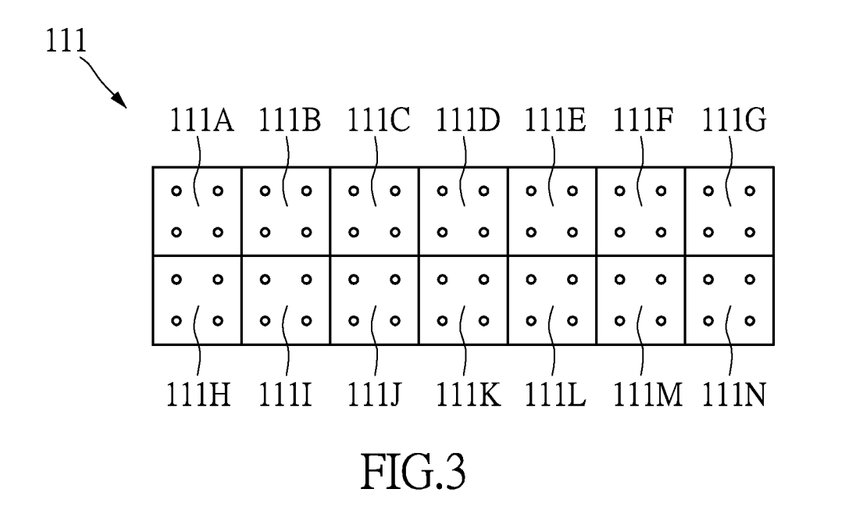
FIG. 3 shows a functional block diagram of the connecting port shown in FIG. 1.

Please refer to FIGS. 1 to 3. FIG. 1 shows a functional block diagram of a smart card module and a peripheral platform in accordance with an embodiment of the instant disclosure, FIG. 2 shows a functional block diagram of the processing unit shown in FIG. 1, and FIG. 3 shows a functional block diagram of the connecting port shown in FIG. 1.

The smart card module 11 provided in the embodiment of the instant disclosure can be implemented in different peripheral platforms to form different electronic devices to respectively provide different applications. For example, the smart card module 11 is capable of being in combination with a peripheral platform to form an electronic device, such as a desktop computer, a laptop, a tablet, a remote controller, a key, or a satellite navigation device, and so on. The different electronic devices respectively have different functions according to the field of application. However, the functions of the electronic device need to be enabled by the smart card module 11 of the embodiment of the instant disclosure.

Please refer to FIG. 1. In the instant embodiment, the smart card module 11 is in combination with a peripheral platform 10 to form an electronic device 1. Notably, the peripheral platform 10 includes a transmitting port 100 and a plurality of interface connectors 102a-102e.

An electrical connection between the peripheral platform 10 and the smart card module is established through the transmitting port 100. In addition, the peripheral platform 10 can be optionally electrically connected to other peripheral devices 2a-2d respectively through the interface connectors 102a-102e. That is, the interface connectors 102a-102e correspond to a plurality of predetermined operating functions. For example, when the electronic device is served as a desktop computer, the peripheral platform 10 may be an expansion platform, and the peripheral devices 2a-2d are such as a display screen, a mouse, a keyboard, a printer, a loudspeaker, or other devices commonly used and provided for the user. However, in another embodiment, when the electronic device is a remote controller, the peripheral platform 10 may have an infrared transmitter or other wireless communication device instead of the interface connectors 102a-102e.

Additionally, in the instant embodiment, the peripheral platform 10 can include a memory 101, which is electrically connected to the transmitting port 100. Notably, an identification data of the peripheral platform 10 is stored in the memory 101. In one embodiment, the identification data is a basic input/output system (BIOS) data corresponding to each of the interface connectors 102a-102e. That is, the BIOS data includes the function-programming commands for enabling each of the interface connectors 102a-102e.

The smart card module 11 includes a processing unit 110 and a connecting port 111 electrically connected thereto. The processing unit 110 can include one or more processors, controllers, a microprocessor, microcontroller, application-specific integrated circuit, digital signal processor, programmable logic device (PLD), field programmable gate array (FPGA) and memory or any combination thereof. However, the instant disclosure is not limited to the type of the processing unit 110.

Please refer to FIG. 2. In the embodiment shown in FIG. 2, the processing unit 110 includes at least one processor 113 and a plurality of functional chips 114 which are electrically connected to the processor 113. The functional chips are controlled by the processor 113 to respectively transmit different controlling signals.

The abovementioned functional chips 114 can include such as a low power double-data-rate (LP-DDR) memory control chip, a wireless local area network (WLAN) chip, a global positioning system (GPS) chip, a long term evolution (LTE) chip, a power management integrated circuit (PMIC) chip, a sensor hub chip, a near field communication (NFC) chip, an audio codec chip, a display chip, a high-definition multimedia interface (HDMI) chip, a front camera chip, a rear camera chip, a touch control chip, a NOR flash chip, an embedded multimedia card (eMMC), a secure digital (SD) chip, a USB control chip, and so on.

The processor 113 and the functional chips can be integrated on the same printed circuit board by using system-on-chip technique so that the size of the smart card module 11 is similar to that of a name card for portable convenience.

The connecting port 111 corresponds to the aforementioned transmitting port 100 and includes a plurality of pins (not shown), which are respectively defined to have different functions to support multiple signal transmission formats. In the instant embodiment, the connecting port 111 includes at least 77 pins with different functions, and the pins are grouped into a plurality of pin sets according to their predefined functions, which respectively correspond to the functional chips 114. The pin sets at least include a main power supply pin set, a data transmitting/receiving pin set, a USB pin set, an audio input pin set, an audio output pin set, a video signal transmission pin set, a camera data pin set, a touch control pin set, a card detect pin set, or the pin set for the other functions, which are not intended to limit the instant disclosure.

Please refer to FIG. 3. In the instant embodiment, different pin sets are respectively arranged in different blocks 111A-111N. Additionally, the transmitting port 100 has different sets of contact terminals arranged respectively corresponding to the positions of pin sets of the connecting port 111.

It is worth noting that the main power supply pin set includes a plurality of power and ground pins. When the smart card module 11 is plugged into the peripheral platform 10, the power and ground pins and the corresponding contact terminals of the transmitting port 100 form a power supply circuit. As such, the peripheral platform 10 is capable of supplying the power for the operation of the processing unit 110 of the smart card module 11. In one embodiment, the voltage of power supplied to the smart card module 11 ranges from 12V to 19V.

In addition, in the instant embodiment, the data transmitting/receiving pin set includes a plurality of general purpose input/output (GPIO) pins to receive the identification data provided by the peripheral platform 10. In one embodiment, the identification data of the peripheral platform 10 is a basic input/output system (BIOS) data 101a.

In general, when the connecting port 111 is electrically connected to the transmitting port 100, the processing unit 110 can retrieve the BIOS data 101a stored in the memory 101 to obtain a plurality of predetermined operating functions required by the first peripheral platform 10 to be enabled. The processing unit 110 then executes some of the functional chips 114 according to the predetermined operating functions of the peripheral platform 10.

That is to say, in one embodiment, the processing unit 110 does not have to execute all of the functional chips 114, but executes only some of the functional chips 114 corresponding to the predetermined operating function according to the BIOS data 101a. For example, the smart card module 11 is in combination with the peripheral platform 10 to form the electronic device 1, which serves as a remote control. After the processing unit 110 determines the remote control does not have a camera function, the processing unit 110 does not execute the functional chips 114 corresponding to the camera function, such as the front camera chip and a rear camera chip.

In another embodiment, the memory 101 of the peripheral platform 10 can be omitted, but the smart card module 11 further includes a memory unit 112 electrically connected to the processing unit 110. The memory unit 112 stores a data base 1120 and a lookup table 1121. The data base 1120 records a plurality of identification data and corresponding types of the peripheral platforms, and the lookup table 1121 records a plurality of identification data and a plurality of corresponding predetermined operating functions.

For example, the smart card module 11 can be implemented in a first peripheral platform and a second peripheral platform. The first peripheral platform requires a plurality of first predetermined operating functions to be enabled, and the second peripheral platform requires a plurality of second predetermined operating functions to be enabled. The plurality of first predetermined operating functions is not necessarily the same as the plurality of second predetermined operating functions.

In addition, the data base 1120 records a first identification data and a second identification data respectively corresponding to the first and second peripheral platforms. The lookup table 1121 records the first identification data corresponds to the plurality of first predetermined operating functions, and the second identification data corresponds to the plurality of second predetermined operating functions. When the processing unit 110 receives the first or second identification data provided by the first or second peripheral platform, the processing unit 110 executes some of the functional chips 114 to correspondingly enable the plurality of first or second predetermined operating functions according to the data base 1120 and the lookup table 1121.

In one embodiment, the abovementioned identification data, such as the first and second identification data, is a code defined according to a voltage level change of each of the GPIO pins. Specifically, if assuming the data transmitting/receiving pin set includes four GPIO pins, sixteen ($2^4$) different codes can be defined according to the four GPIO signals respectively generated by the voltage level changes of the four GPIO pins. The sixteen codes can be defined to respectively correspond to different kinds of the peripheral platforms for different applications.

When the connecting port 111 is plugged into and electrically connected to the transmitting port 100, the processing unit 110 can detect the changes of the voltage levels of the GPIO pins to determine the identification data. Subsequently, by contrasting the identification data with the data base 1120 and the lookup table 1121, the processing unit 110 can determine the peripheral platform and the predetermined operating functions corresponding to the identification data, and execute some of the functional chips 114 according to the predetermined operating functions.

Figure 4:
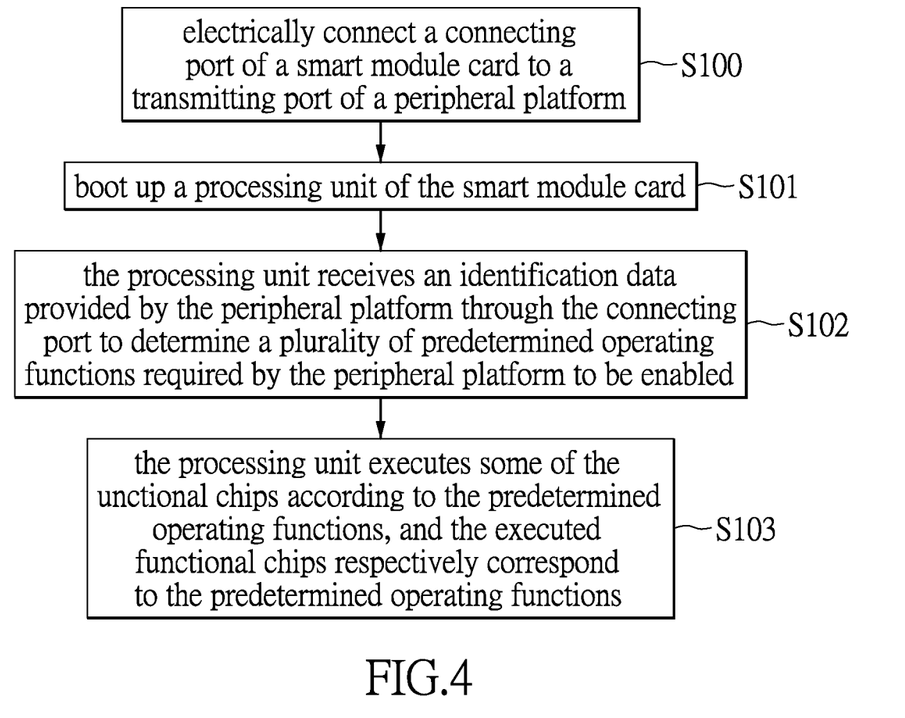
FIG. 4 shows a flow chart of a using method of the smart card module in accordance with an embodiment of the instant disclosure.

Please refer to FIG. 4. FIG. 4 shows a flow chart of a using method of the smart card module in accordance with an embodiment of the instant disclosure. The using method of the smart card module according to an embodiment of the instant disclosure is capable of being executed in different kinds of peripheral platforms. For example, the peripheral platform 10 as shown in FIG. 1 and the peripheral platform without the memory 101.

Firstly, in step S100, the connecting port of the smart card module is electrically connected to the transmitting port of the peripheral platform. Specifically, in one embodiment, the connecting port is plugged into the transmitting port to establish the electrical connection between the smart card module and the peripheral platform.

Subsequently, in step S101, the processing unit is booted up. In the instant embodiment, the peripheral platform can be electrically connected to an external power supply. When the electrical connection between the smart card module and the peripheral platform is established, the external power supply provides power to the smart card module through the peripheral platform to boot up the processing unit of the smart card module.

Next, in step S102, the processing unit receives an identification data provided by the peripheral platform through the connecting port so as to determine a plurality of predetermined operating functions required by the peripheral platform to be enabled. Specifically, in the instant embodiment, the identification data can be a BIOS data stored in the peripheral platform, or a code defined according to a voltage level change of each of the pins.

If the identification data is the BIOS data stored in the peripheral platform, the processing unit can determine the predetermined operating functions required by the peripheral platform to be enabled according to the BIOS data.

In addition, if the identification data is the code generated by the voltage level changes of the pins, the method further includes the step of establishing a lookup table recording the plurality of identification data and a plurality of corresponding predetermined operating functions before the processing unit receives the identification data. The lookup table can be stored in a memory of the smart card module. Additionally, after receiving the identification data, the processing unit contrasts the identification data with the lookup table to determine the predetermined operating functions required by the peripheral platform to be enabled.

Subsequently, in step S103, the processing unit executes some of the functional chips according to the predetermined operating functions required by the peripheral platform to be enabled, and the executed functional chips respectively correspond to the predetermined operating functions.

Figure 5A:
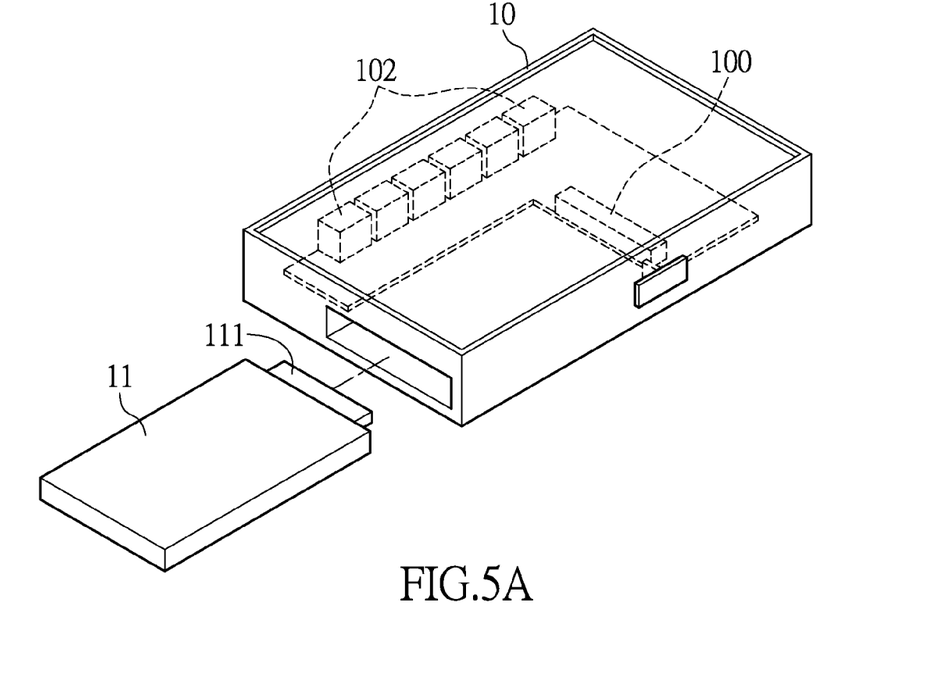
FIG. 5A shows a schematic diagram of a smart card module before being plugged into a peripheral platform in accordance with an embodiment of the instant disclosure.
Figure 5B:
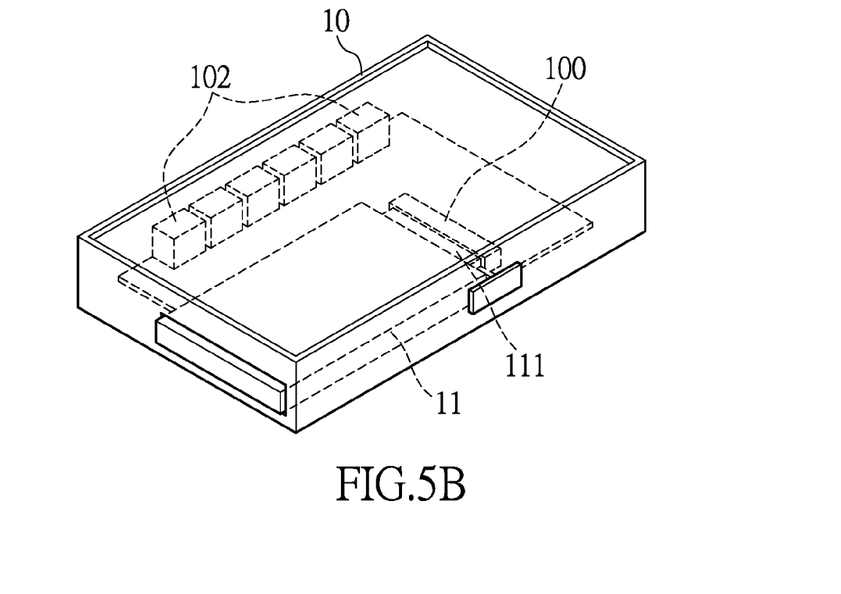
FIG. 5B shows a schematic diagram of a smart card module plugged into a peripheral platform in accordance with an embodiment of the instant disclosure.

Please refer to FIG. 5A and FIG. 5B. FIG. 5A shows a schematic diagram of a smart card module before being plugged into a peripheral platform in accordance with an embodiment of the instant disclosure, and FIG. 5B shows a schematic diagram of a smart card module plugged into a peripheral platform in accordance with an embodiment of the instant disclosure.

As shown in FIG. 5A, the smart card module 11 having a card-like shape is convenient for the user to carry. In addition, the peripheral platform 10 includes a housing having a slot for receiving the smart card module 11.

Please refer to FIG. 5B. When the smart card module 11 is inserted into the slot, an electrical connection between the connecting port 111 and the peripheral platform 10 is established, i.e., the smart card module 11 is electrically connected to the interface connectors 102 through the connecting port 111 and the transmitting port 100. Based on the steps of method shown in FIG. 4, the processing unit 110 of the smart card module 11 can execute some of the functional chips 114 according to the predetermined operating functions required by the peripheral platform to be enabled.

Figure 6:
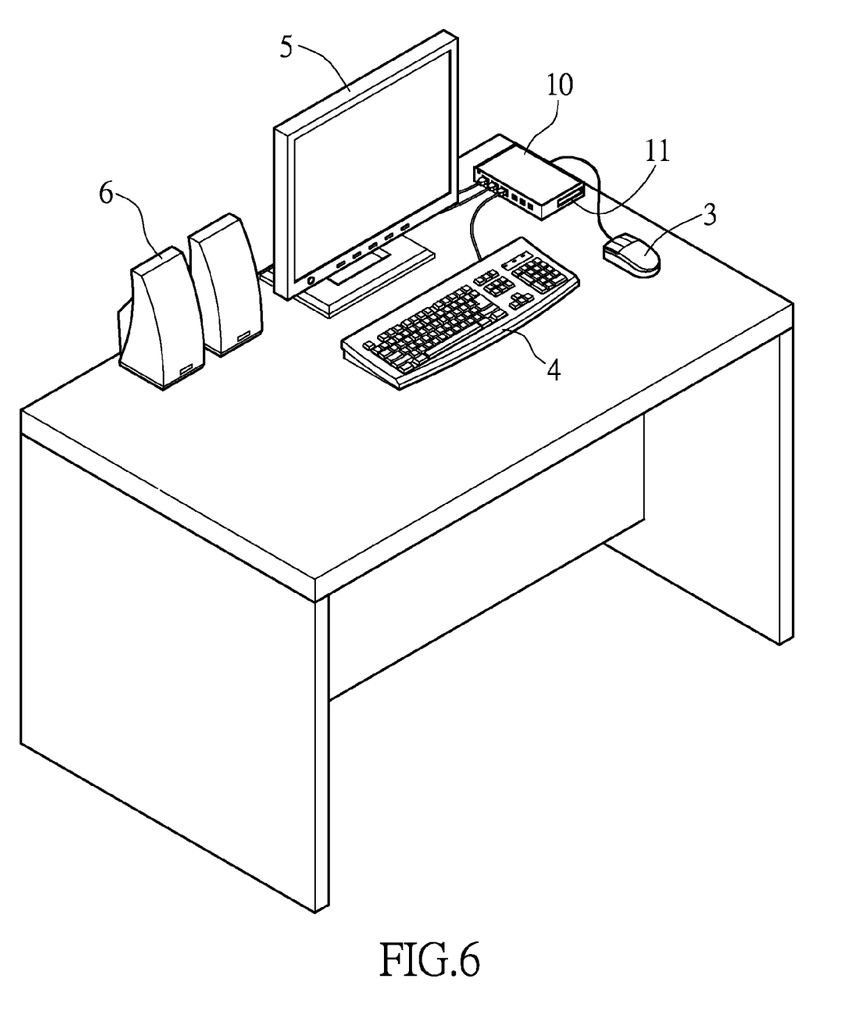
FIG. 6 shows a schematic diagram of a smart card module in combination with the peripheral platform for one of the applications in accordance with an embodiment of the instant disclosure.

Please refer to FIG. 6. FIG. 6 shows a schematic diagram of a smart card module in combination with the peripheral platform for one of the applications in accordance with an embodiment of the instant disclosure. In the instant embodiment, the peripheral platform 10 is electrically connected to peripheral devices, such as a mouse 3, a keyboard 4, a display screen 5, a loudspeaker 6, and so on. Notably, the peripheral platform 10 does not have any control chip for controlling the peripheral devices. Accordingly, the user cannot operate the peripheral devices before the smart card module 11 is inserted into the peripheral platform 10. Furthermore, because the processing unit 110 of the smart card module 11 can serve as a central core for processing data, the user can use the peripheral devices through the control of the processing unit 110 like using a personal computer.

Figure 7:
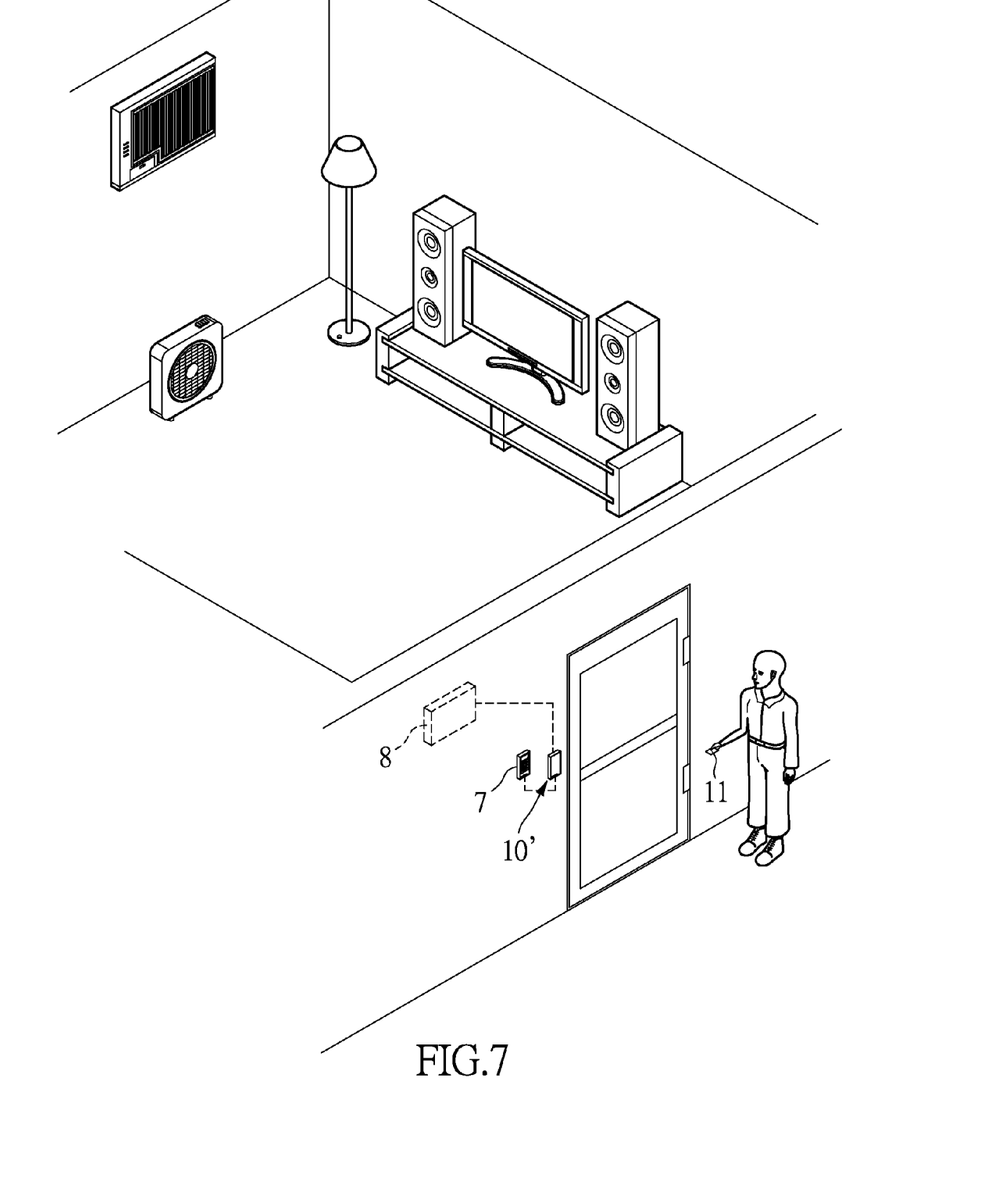
FIG. 7 shows a schematic diagram of a smart card module in combination with the peripheral platform for another application in accordance with an embodiment of the instant disclosure.

Additionally, please refer to FIG. 7. FIG. 7 shows a schematic diagram of a smart card module in combination with the peripheral platform for another application in accordance with an embodiment of the instant disclosure. In the embodiment shown in FIG. 7, the peripheral platform 10' is electrically connected to an electronic lock 7 and a main switch 8 of a room for controlling the switches of the home appliances in the room. After the user inserts the smart card module 11 into the peripheral platform 10', the user can unlock the electronic lock 7 by operating the electronic lock 7, such as inputting fingerprint information or password information. In addition, the main switch 8 is turned on so that the user can use each of the home appliances in the room. That is, in the instant embodiment, the smart card module 11 can be adapted to function as a room card.

However, the abovementioned examples do not intended to limit the application of the smart card module 11. In another embodiment, the smart card module 11 may serve as an automatic teller machine (ATM) card, or be applied in other electronic devices of different fields, such as a laptop, tablet, smart TV, remote control, car key, satellite navigation device, digital camera, and so on.

The Effectiveness of the Embodiments

In summary, the smart card module and the using method thereof according to the embodiments of the instant disclosure provide the following advantages: by receiving the identification data provided by the peripheral platform, the processing unit of the smart card module is capable of determining the predetermined operating functions required by the peripheral platform to be enabled in advance. Subsequently, the processing unit can execute some of the functional chips respectively corresponding to the predetermined operating functions required to be enabled. As such, the same smart card module can be adapted to different kinds of peripheral platforms, which have different predetermined operating functions, to form different kinds of electronic devices for different purposes. Specifically, one smart card module can serve as a processing core adapted to multiple kinds of electronic devices, such as the personal computer, a room key or other electronic devices for other purposes, after being in combination with the peripheral platform.

In addition, the smart card module provided in the embodiments of the instant disclosure can be adapted to different operating environments. Accordingly, the number of computers owned by one person may be reduced. Furthermore, when the system upgrade is required, only the smart card module needs to be replaced while the peripheral equipment can be kept so that the negative impact on the environment can be attenuated.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A smart card module adapted to a first peripheral platform to be function as a first electronic system, wherein the first peripheral platform has a plurality of first interface connectors for respectively electrically connecting to a plurality of first peripheral devices, the first interface connectors respectively correspond to a plurality of first predetermined operating functions, and the first peripheral platform includes a first transmitting port, the smart card module comprising:
   a connecting port corresponding to the first transmitting port; and
   a processing unit electrically connected to the connecting port and having a plurality of functional chips;
   wherein when the connecting port is electrically connected to the first transmitting port, the processing unit receives a first identification data provided by the first peripheral platform through the connecting port, the first identification data corresponds to the first predetermined operating functions, the processing unit determines the first predetermined operating functions required by the first interface connectors, and executes some of the functional chips according to the first predetermined operating functions to enable the first interface connectors, and the executed functional chips respectively correspond to the first predetermined operating functions.

2. The smart card module according to claim 1, wherein the smart card module is adapted to a second peripheral platform to function as a second electronic system, wherein the second peripheral platform has a plurality of second interface connectors for respectively electrically connecting to a plurality of second peripheral devices, wherein the first and second electronic systems are different in functions, the second interface connectors respectively correspond to a plurality of second predetermined operating functions, and the second peripheral platform has a second transmitting port, when the connecting port is electrically connected to the second transmitting port, the processing unit receives a second identification data provided by the second peripheral platform through the connecting port, the second identification data corresponds to the second predetermined operating functions, the processing unit to determines the second predetermined operating functions required by the second interface connectors, and executes some of the functional chips according to the second predetermined operating functions to enable the second interface connectors, and the executed functional chips respectively correspond to the second predetermined operating functions.

3. The smart card module according to claim 2, wherein the connecting port includes a plurality of pin sets respectively corresponding to the plurality of functional chips, and at least one of the pin sets is a data transmitting/receiving pin set.

4. The smart card module according to claim 3, wherein the data transmitting/receiving pin set includes a plurality of GPIO pins;

wherein when the connecting port is electrically connected to the first transmitting port, the processing unit detects a voltage level change of each of the GPIO pins to determine the first identification data;

when the connecting port is electrically connected to the second transmitting port, the processing unit detects a voltage level change of each of the GPIO pins to determine the second identification data.

5. The smart card module according to claim 3, wherein at least another one of the pin sets is a USB pin set, an audio input pin set, an audio output pin set, a video signal transmission pin set, a camera data pin set, a touch control pin set, or a card detect pin set.

6. The smart card module according to claim 2, further comprising a memory unit electrically connected to the processing unit, wherein the memory unit stores a lookup table recording the first predetermined operating functions corresponding to the first identification data and the second predetermined operating functions corresponding to the second identification data, wherein when the processing unit receives the first identification data or the second identification data, the processing unit executes some of the functional chips to correspondingly enable the first interface connectors or the second interface connectors according to the lookup table.

7. The smart card module according to claim 1, wherein the first peripheral platform includes a memory, and the first identification data is stored in the memory, when the connecting port is electrically connected to the first transmitting port, the processing unit retrieves the first identification data from the memory.

8. The smart card module according to claim 7, wherein the first identification data is a basic input/output system (BIOS) data corresponding to the first interface connectors;

wherein when the processing unit receives the first identification data, the processing unit executes some of the functional chips according to the basic input/output system data to correspondingly enable the first interface connectors.

9. An operating method of the smart card module, wherein the smart card module is adapted to a peripheral platform to function as an electronic system and includes a connecting port and a processing unit electrically connected thereto, the processing unit includes a plurality of functional chips, and the peripheral platform includes a plurality interface connectors for electrically connecting to a plurality of peripheral devices, and the interface connectors respectively correspond to a plurality of predetermined operating functions, the method comprising:

booting up the processing unit after the connecting port is connected to a transmitting port of the peripheral platform;

receiving an identification data provided by the peripheral platform;

determining the predetermined operating functions required by the interface connectors; and executing some of the functional chips according to the predetermined operating functions to enable the interface connectors, wherein the executed functional chips respectively correspond to the predetermined operating functions.

10. The operating method of the smart card module according to claim 9, wherein the peripheral platform includes a memory, and the identification is stored in the memory, wherein the step of receiving an identification data is performed by the processing unit and the processing unit retrieves the identification data from the memory when the connecting port is electrically connected to the transmitting port.

11. The operating method of the smart card module according to claim 9, wherein the identification data is a basic input/output system (BIOS) data corresponding to the interface connectors.

12. The operating method of the smart card module according to claim 9, wherein the identification data is a code defined according to a voltage level change of each of a plurality of pins.

13. The operating method of the smart card module according to claim 12, further comprising establishing a lookup table recording a plurality of identification data and a plurality of corresponding predetermined operating functions, wherein the lookup table is stored in a memory unit of the smart card module.

14. The operating method of the smart card module according to claim 13, wherein after the step of receiving the identification data, the processing unit determines the predetermined operating functions by contrasting the identification data with the lookup table.

* * * * *